(12) United States Patent
Goncalves

(10) Patent No.: US 8,251,189 B2
(45) Date of Patent: Aug. 28, 2012

(54) RAILWAY BRAKE CYLINDER

(75) Inventor: Claudino Goncalves, Ribeaucourt (FR)

(73) Assignee: Faiveley Transport Amiens, Amiens (FR)

( * ) Notice: Subject to any disclaimer, the term of this patent is extended or adjusted under 35 U.S.C. 154(b) by 371 days.

(21) Appl. No.: 12/647,109

(22) Filed: Dec. 24, 2009

(65) Prior Publication Data

US 2010/0155185 A1    Jun. 24, 2010

(30) Foreign Application Priority Data

Dec. 24, 2008  (FR) ...................................... 08 59061

(51) Int. Cl.
    *B60T 11/10*    (2006.01)
(52) U.S. Cl. ............... 188/153 D; 188/106 P; 188/107; 188/156; 188/170; 188/265; 91/442; 91/443; 91/446; 91/448; 137/625.25; 137/625.67; 137/625.68; 137/625.69
(58) Field of Classification Search .............. 188/153 D; 303/4, 72.3, 115.6, 2; 137/625.68, 625.25, 137/625.67; 91/443; *B61H 5/00, 13/38; F16D 65/52*
See application file for complete search history.

(56) References Cited

U.S. PATENT DOCUMENTS

| | | | |
|---|---|---|---|
| 253,139 A * | 1/1882 | Foldes ............................... | 303/4 |
| 1,877,700 A * | 9/1932 | Silvene ........................... | 303/69 |
| 2,675,099 A * | 4/1954 | Troy ................................ | 303/31 |
| 3,234,968 A * | 2/1966 | Frantz ....................... | 137/625.63 |
| 5,429,426 A | 7/1995 | Hart | |

FOREIGN PATENT DOCUMENTS

| | | |
|---|---|---|
| FR | 2 716 856 A1 | 9/1995 |
| GB | 264197 A | 1/1927 |
| GB | 865155 A | 4/1961 |

OTHER PUBLICATIONS

French Search Report dated Aug. 17, 2009.

* cited by examiner

*Primary Examiner* — Robert A Siconolfi
*Assistant Examiner* — San Aung
(74) *Attorney, Agent, or Firm* — Young & Thompson

(57) ABSTRACT

A railway brake cylinder includes a body (11'); a piston (13') mobile relative to the body (11') to act on a brake linkage and delimiting with the body (11') a pressure chamber (10') adapted to be supplied by a pneumatic pressure agent source; an auxiliary actuating member (26') mobile relative to the body (11') and the piston (13'), mechanically connected to manual operating elements to cause it to occupy either a rest position in which it is away from the piston (13') or a pushing position in which it is in contact with the piston (13'); two orifices (73', 51') in fluid communication with the chamber (10') and the atmosphere, respectively; and selective connecting elements (28') between the two orifices (73', 51'), the elements (28') being mechanically connected to the auxiliary actuating member.

19 Claims, 5 Drawing Sheets

RAILWAY BRAKE CYLINDER

The invention concerns the field of railway vehicle brakes.

It concerns more particularly a brake cylinder operated by a pneumatic pressure agent and adapted to act on a linkage in order to actuate a braking device, including for example one or more friction pads adapted either to clamp a brake disk connected to the wheels of the vehicle or to clamp directly a wheel of the vehicle.

Such a brake cylinder generally includes a body and a piston mobile relative to the body to act on a brake linkage and delimiting with said body a pressure chamber adapted to be fed by a pneumatic pressure agent source.

Some brake cylinders further include a manual braking device including an auxiliary actuating member mobile relative to said body and said piston. In the absence of external loads, this member occupies a rest position in which it is away from the piston and so exerts no force on it. After the railway vehicle has been stopped by the action of the pressure agent on the piston, an operator actuates this member, for example with the assistance of a multiplier lever, to cause it to occupy a pushing position in which it is in contact with the piston and exerts a mechanical force on it.

The invention aims to improve brake cylinders including such a manual braking device.

To this end, the invention is aimed at a railway brake cylinder including:

a body;

a piston mobile relative to the body to act on a brake linkage and delimiting with said body a pressure chamber adapted to be supplied by a pneumatic pressure agent source;

an auxiliary actuating member mobile relative to said body and said piston, said actuating member being mechanically connected to manual operating means to cause it to occupy:

either a rest position in which it is away from said piston and so exerts no force on said piston;

or a pushing position in which it is in contact with said piston and exerts a mechanical force on it;

characterized in that the brake cylinder includes:

a first orifice in fluid communication with said chamber;

a second orifice in fluid communication with the atmosphere; and selective connection means between said first orifice and said second orifice, said selective connection means being adapted to occupy:

an isolating position in which said first orifice and said second orifice are isolated from each other; and a connecting position in which said first orifice and said second orifice are in fluid communication;

said selective connecting means being mechanically connected to said auxiliary actuating member so that:

when said auxiliary actuating member occupies said rest position, said selective connection means occupy said isolating position; and when said auxiliary actuating member occupies said pushing position, said selective connecting means occupy said connecting position.

If an operator actuates the auxiliary actuating member manually, the selective connecting means mechanically connected to the auxiliary actuating member change position to establish fluid communication between the first and second orifices of the cylinder. The pressure chamber is therefore in fluid communication with the atmosphere, which vents the pressure agent and eliminates the pneumatic force exerted on the piston.

Accordingly, the pneumatic braking force is virtually zero when the actuating member comes into contact with the piston.

The non-superposition of pneumatic and manual braking that the cylinder of the invention offers avoids overspecification of the piston and the linkage as has been resorted to in conventional brake cylinders with a manual braking device.

Necessitating less material for their fabrication, they are lighter in weight (which helps to improve the performance of the railway vehicle), less bulky (which is important in a railway vehicle where space is at a premium), and more economic. Finally, these elements are also simpler to fabricate.

According to preferred features, separately or in combination:

said selective connecting means include a slide mounted inside said auxiliary actuating member so that:

when said auxiliary actuating member is in the rest position, said slide projects from said member toward said piston; and when said auxiliary actuating member is in its pushing position, said slide is flush with said auxiliary actuating member and in contact with said piston;

said railway brake cylinder includes a third orifice in communication with said pneumatic pressure agent source so that:

when said slide occupies said isolating position, said third orifice and said first orifice are in fluid communication; and when said slide occupies said connecting position, said third orifice and said first orifice are isolated from each other;

said railway brake cylinder includes a spring for continuously loading said slide toward said projecting position;

said spring is disposed between said slide and said auxiliary actuating member;

said manual operating means include a force multiplier member for acting on said auxiliary actuating member;

said selective connecting means include a distributor including said first orifice and said second orifice, said distributor and said auxiliary actuating member being connected by mechanical connecting means so that they can be actuated simultaneously;

said distributor includes return means for loading it continuously toward its isolating position;

said distributor includes a third orifice in fluid communication with said pneumatic pressure agent source so that:

when said distributor occupies said isolating position, said third orifice and said first orifice are in fluid communication; and when said distributor occupies said connecting position, said third orifice and said first orifice are isolated from each other;

said pressure chamber is continuously in fluid communication with said pneumatic pressure agent source;

said manual operating means include a force multiplier member for acting on said auxiliary actuating member and said distributor;

said railway brake cylinder includes a second distributor including a first orifice in fluid communication with said chamber and a second orifice in fluid communication with said pneumatic pressure agent source, said second distributor being adapted to occupy:

an isolating position in which said first orifice and said second orifice are isolated from each other; and a connecting position in which said first orifice and said second orifice are in fluid communication;

said mechanical connecting means also connecting said second distributor to said auxiliary actuating member and to said distributor so that:

when said auxiliary actuating member occupies said rest position and said distributor occupies said isolating position, said second distributor occupies said connecting position; and when said auxiliary actuating member occupies said pushing position and said distributor occupies said connecting position, said second distributor occupies said isolating position;

said second distributor includes return means for continuously loading said second distributor toward its isolating position; and/or said manual operating means include a force multiplier member for acting on said auxiliary actuating member, said distributor and said second distributor.

Other features and advantages of the invention will become apparent in the light of the following description of preferred embodiments of the invention, which description is given by way of nonlimiting example and with reference to the appended drawings, in which.

Figure 1:
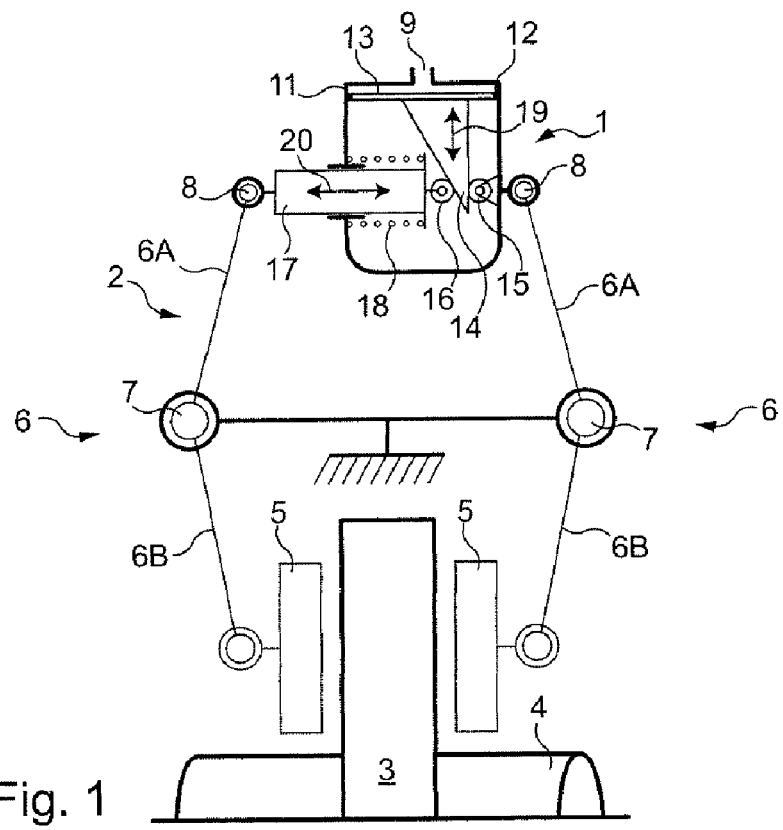
FIGS. 1 and 2 illustrate diagrammatically the operating principles of a railway brake linkage actuated by a brake cylinder with that brake cylinder respectively in a waiting position (FIG. 1) and a braking position (FIG. 2)
Figure 2:
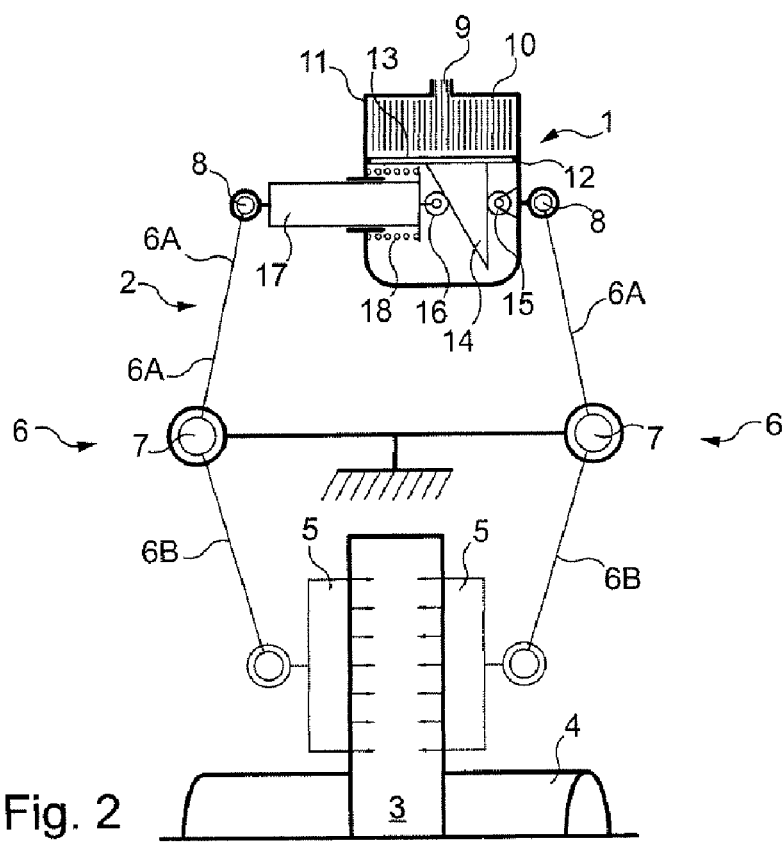

FIGS. 1 and 2 represent a brake cylinder 1 which, in the present example, is adapted to actuate a railway brake linkage 2. This system acts on a brake disk 3 mounted on an axle 4 of the railway vehicle, for example, or directly on the wheel to be braked. The brake disk 3 is here seen in profile and only its upper half is shown.

The linkage 2 includes in the standard manner two brake pads 5 disposed on respective opposite sides of the brake disk 3 and which, in the absence of loading, are away from the brake disk 3 (see FIG. 1) and, during braking, are loaded by the linkage 2 against the brake disk 3 (see FIG. 2) to slow and/or stop the brake disk 3 by friction.

To this end the linkage 2 includes two rigid levers 6 each including an upper arm 6A and a lower arm 6B fastened together, each lever 6 being mounted to rotate about an axle 7 fastened to the chassis of the railway vehicle. The lower arm 6B of each lever 6 is connected to one of the brake pads 5. The upper arm 6A of each lever 6 is connected to an articulation 8.

Given this standard assembly of the linkage 2, moving the two articulations 8 farther apart applies the brake and moving the articulations 8 closer together releases the brake.

The brake cylinder 1 is attached by two of its ends to the articulations 8 and is adapted to impart to the articulations 8 just such a movement toward each other or away from each other.

To this end, the brake cylinder 1 is connected by a pipe 9 to a pneumatic pressure agent source such as a compressed air source, for example.

The brake cylinder 1 includes a body 11, a piston 13 and a sliding seal 12 adapted to rub on the edges of the body 11 so as to define a pressure chamber 10. The piston 13 is attached to a wedge part 14 having a triangular section. The wedge part 14 cooperates with a first rolling thrust bearing 15 connected to the body 11 and with a second rolling thrust bearing 16 connected to a push rod 17.

The push rod 17 is formed of a device usually called a "slack adjuster" for transmitting movements of the rolling thrust bearing 16 directly to the corresponding articulation 8 and taking up slack between the second rolling thrust bearing and the wedge part 14. These slack adjusters are standard devices that are not described in more detail here. Suffice to say here that the thrust rod 17 is adapted to transmit forces exerted on the second rolling thrust bearing 16 to the corresponding articulation 8.

A spring 18 disposed between the body 11 and the thrust rod 17 has the function of loading the second rolling thrust bearing 16 against the wedge part 14.

Thus the brake cylinder 1 is mounted between the two articulations 8, the body 11 being fastened to one of these articulations 8 and the end of the thrust rod 17 being fastened to the other articulation 8.

The piston 13 and the wedge part 14 are mobile in a first direction 19 that is vertical in FIGS. 1 and 2. The push rod 17 is mobile in a second direction 20 perpendicular to the first direction 19 and is horizontal in FIGS. 1 and 2.

Given this configuration, if the wedge part 14 is loaded in the first direction 19 so that it is pushed down between the thrust bearings 15, 16, the push rod 17 is consequently loaded in the second direction 20 to cause the two articulations 8 to move away from each other. The wedge part 14 thus transforms the vertical stroke of the piston 13 into a horizontal stroke of the push rod 17 in order to actuate the levers 6.

In FIG. 1, the brake cylinder 1 is represented in a waiting position. In this position, no fluid pressure is exerted, i.e. the pipe 9 is at atmospheric pressure. The spring 18 that loads the second rolling thrust bearing 16 toward the first rolling thrust bearing 15 causes the wedge part 14 and the piston 13 to rise, with the result that the pressure chamber 10 has a minimum volume.

In FIG. 2, the brake cylinder 1 is represented in a braking position. The pipe 9 receives the pressure agent that fills the chamber 10 and loads the piston 13 and the wedge part 14 downwards, the effect of which is to move the thrust bearings 15, 16 and therefore the articulations 8 away from each other. The volume of the pressure chamber 10 is at a maximum in this position.

As soon as the pressure in the pipe 9 is eliminated, the spring 18 returns the brake cylinder 1 to its FIG. 1 waiting position and expels the pressure agent from the chamber 10.

The brake cylinder 1' of a first embodiment of the invention is described next with reference to FIG. 3. Elements similar to elements of the brake cylinder 1 described above retain the same number but with a prime symbol (').

Thus the brake cylinder 1' includes a body 11' forming an envelope in which the various elements of the brake cylinder 1' are mounted, including a piston 13' mobile in a first direction 19' and fixed to a wedge part 14' adapted to be pushed down between a first rolling thrust bearing 15' and a second rolling thrust bearing 16'. The first rolling thrust bearing 15' is mounted on the body 11' and the second rolling thrust bearing 16' is mounted at the end of a push rod 17' that is mobile in a second direction 20' and the other end 22' of which is connected to one of the articulations 8 from the FIGS. 1 and 2 diagrams, the other articulation 8 being fixed to the body 11'.

Figure 3:
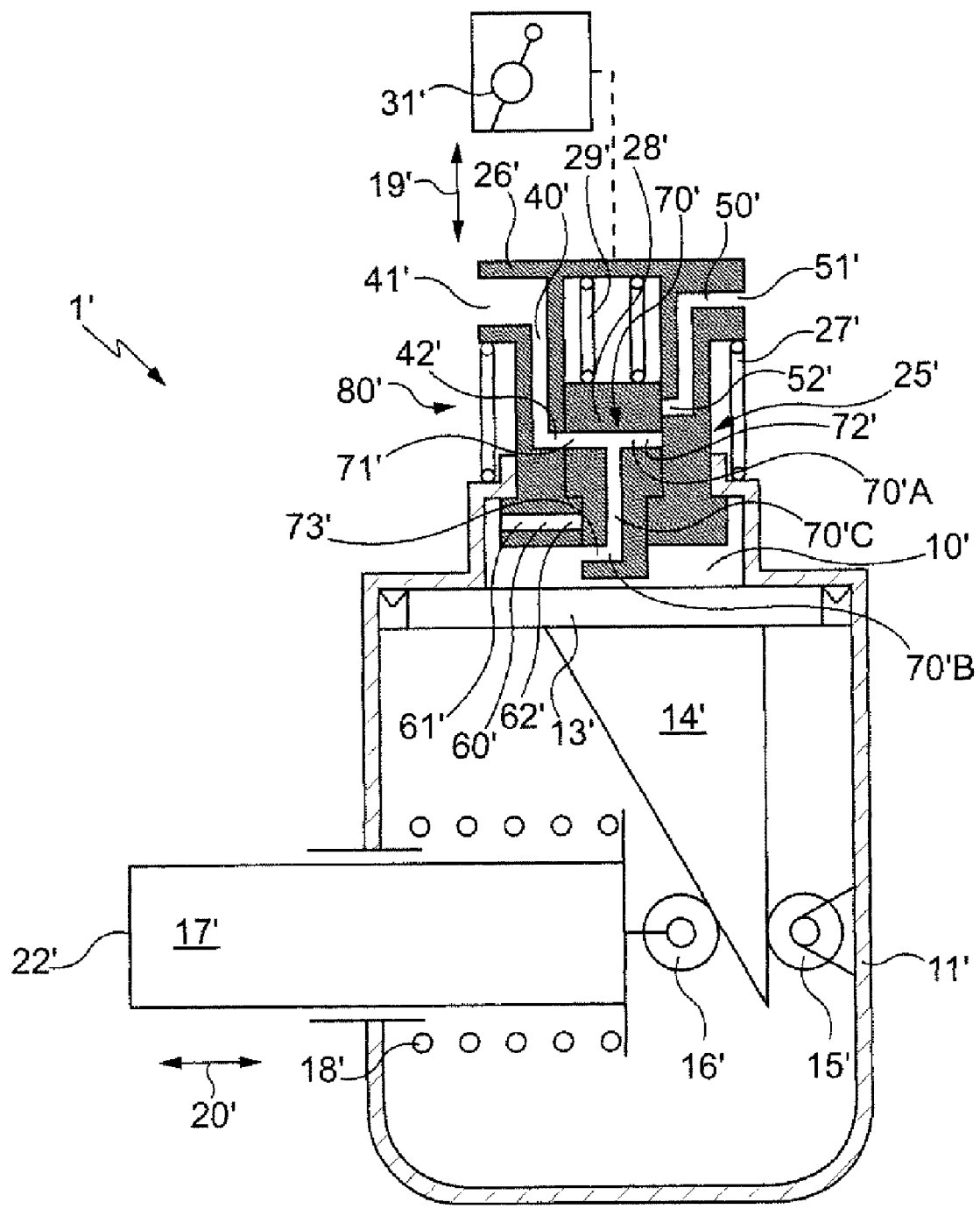
FIGS. 3 to 5 are highly simplified views in section of a brake cylinder of a first embodiment of the invention in various operating positions.

A spring 18' loads the push rod 17' so that the second rolling thrust bearing 16' is moved toward the first rolling thrust bearing 15', i.e. toward the waiting position of the brake cylinder 1 (which is that represented in FIG. 3).

The body 11' has a circular opening 25' facing the piston 13' and receiving a sliding auxiliary actuation member 26' fitting in the opening 25' in a pressure-tight manner thanks to an O-ring seal, not shown. The auxiliary actuating member 26' is continuously loaded away from the piston 13' by standby spring means, formed here of a spring 27'.

The auxiliary actuation member 26' includes three internal pipes 40', 50' and 60'.

The pipe 40' has an external inlet orifice 41' in fluid communication with a pneumatic pressure agent source (here a compressed air source, although other gases can be used instead), not shown, and an internal orifice 42' discharging onto a slide 28' mounted in the actuating member 26' to move between a position (FIGS. 3 and 4) projecting relative to the lower end of the member 26' (that facing the piston 13') and a retracted position (FIG. 5) in which the slide 28' is flush with that same end.

The body 11', the piston 13', the auxiliary actuating member 26' and the slide 28' delimit a pressure chamber 10' supplied with compressed air from the pipe 40'.

The pipe 50' that is located opposite the pipe 40' has an external outlet orifice 51' in fluid communication with the atmosphere and an internal orifice 52' discharging onto the slide 28'.

The pipe 60' located in the vicinity of the lower end of the push member 26' has an external inlet orifice 61' in fluid communication with the pressure chamber 10' and an internal orifice 62' discharging onto the slide 28'.

The slide 28' also includes a pipe 70' with three portions.

The upper first portion 70'A extends transversely to the slide 28' over all of its width so as to have two opposed orifices 71' and 72'. The lower second portion 70'B also extends transversely to the slide over approximately half its width and includes an orifice 73'. The connecting third portion 70'C is on the axis of the slide 28' and connects the two portions 70'A and 70'B.

Moreover, the slide 28' is continuously loaded toward its projecting position by a spring 29' disposed between the slide 28' and the auxiliary actuating member 26'.

When the slide 28' projects relative to the auxiliary actuating member 26' because of the effect of the spring 29' (FIGS. 3 and 4), it occupies a stable isolating position in which:
the internal orifice 42' of the pipe 40' faces the orifice 71' of the pipe 70';
the internal orifice 52' of the pipe 50' is blocked by the slide 28'; and
the orifice 73' of the pipe 70' discharges into the pressure chamber 10';
with the result that:
the orifice 73' and the orifice 51' are isolated from each other (as a consequence of which the pressure chamber 10' is isolated from the atmosphere); and
the orifice 73' and the orifice 41' are in fluid communication (as a consequence of which the pneumatic pressure agent source is in fluid communication with the chamber 10').

When the slide 28' is flush with the auxiliary actuation member 26' (FIG. 5) it occupies a connecting position in which:
the internal orifice 42' of the pipe 40' is blocked by the slide 28';
the internal orifice 52' of the pipe 50' faces the orifice 72' of the pipe 70'; and
the orifice 73' of the pipe 70' faces the internal orifice 62' of the pipe 60', the external orifice 61' of which is in fluid communication with the pressure chamber 10';
with the result that:
the orifice 73' and the orifice 51' are in fluid communication (as a consequence of which the pressure chamber 10' is in fluid communication with the atmosphere); and
the orifice 73' and the orifice 41' are isolated from each other (as a consequence of which the pneumatic pressure agent source is isolated from the chamber 10').

The operation of the brake cylinder 1' is described next, still with reference to FIGS. 3 to 5.

In the configuration represented in FIG. 3, the pressure chamber 10' has been vented and is at atmospheric pressure, the auxiliary actuating member 26' is in the rest position and the slide 28' is in its stable isolating position.

The spring 18' loads the push rod 17' so that the second rolling thrust bearing 16' moves toward the first rolling thrust bearing 15', with the result that the wedge part 14' rises, drawing with it the piston 13, which is then in the topmost position.

To return the brake cylinder 1' to service, compressed air is injected via the external orifice 41' of the pipe 40'. The slide 28' being in its isolating position, the pneumatic pressure agent source is in fluid communication with the pressure chamber 10', which is isolated from the atmosphere.

The pressure chamber 10' is filled with compressed air, the pressure rising as the fluid is introduced, which leads to displacement of the piston 13' and thus braking of the wheel. The configuration is then that shown in FIG. 4.

If an operator wishes to activate manual braking, they use the multiplier lever 31' to exert a force on the auxiliary driving member 26' in the direction 19'. This member 26' then moves progressively toward the piston 13' until the projecting end of the slide 28' touches the piston 13'. The force transmitted by the lever 31' to the member 26' being very much greater than the return force of the spring 29', further movement leads to retraction of the slide 28' and movement thereof to the connecting position. Now in fluid communication with the atmosphere and isolated from the pneumatic pressure agent source, the chamber 10 is vented very quickly. Isolating the chamber 10' from the pressure agent source limits venting to the volume of compressed air contained in the chamber 10' (at the moment the position of the slide 28' changes) and thus prevents any loss of pneumatic pressure agent in the supply circuit.

Continuing movement of the auxiliary actuating member 26' leads to the latter pressing against the piston 13', thus applying to the piston 13' a braking force that is substituted for the braking force previously exerted by the compressed air contained in the chamber 10'. The configuration is then that shown in FIG. 5.

Figure 6:
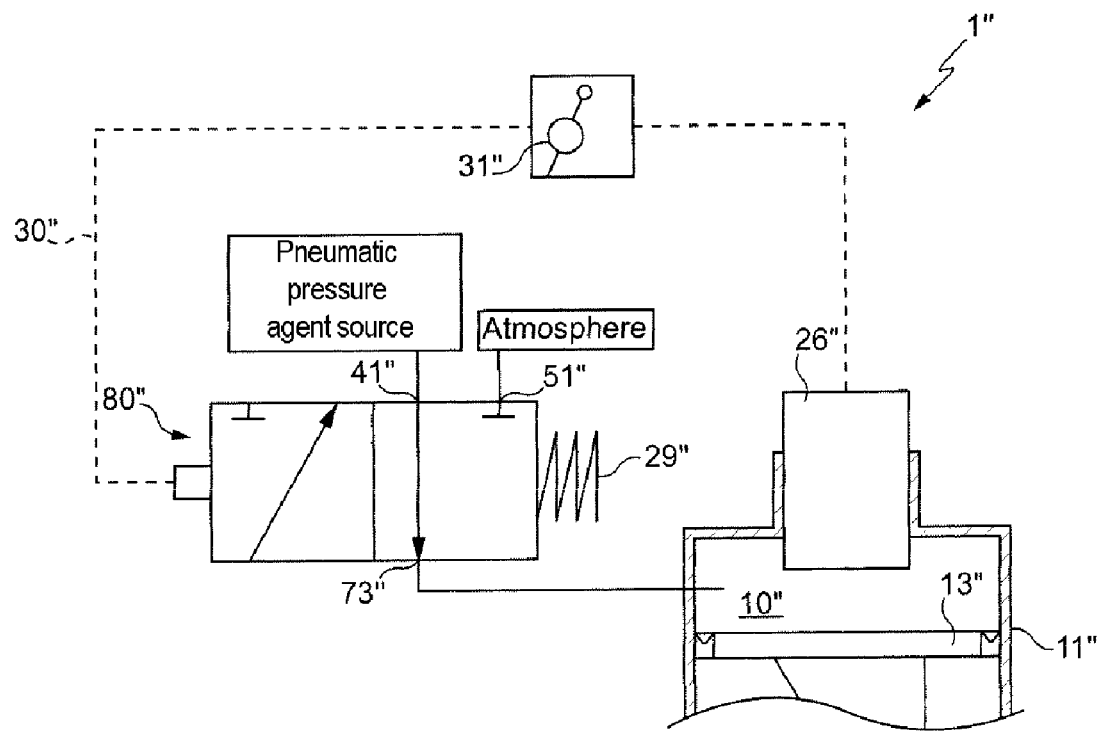
FIG. 6 illustrates diagrammatically the operation of a brake cylinder of a variant of the first embodiment of the invention.

FIG. 6 illustrates diagrammatically a variant of the first embodiment for which the same reference numbers are used but with a " symbol instead of the ' symbol.

The body 11", the piston 13" and the elements of the cylinder 1" that are not represented are identical to those described above.

However, the cylinder 1" does not include a slide mobile in the auxiliary actuating member 26", the selective connecting means between the orifices consisting here of a distributor 80" separate from the member 26". The distributor 80" is of the two-position monostable type (thanks to the presence of a spring 29") and has three orifices 41", 51" and 73" respectively connected to a pneumatic pressure agent source, to atmosphere and to the chamber 10".

The distributor 80" is adapted to occupy:
a stable isolating first position in which the orifices 73" and 51" are isolated from each other and the orifices 73" and 41" are in fluid communication; and a connecting second position in which the orifices 73" and 51" are in fluid communication and the orifices 73" and 41" are isolated from each other.

Moreover, the distributor 80" and the auxiliary actuating member 26" are connected by mechanical connecting means 30" so that they can be actuated simultaneously, for example with the aid of a multiplier lever 31", so that:

when the auxiliary actuating member 26" occupies the rest position, the distributor 80" occupies its stable isolating position; and when the auxiliary actuating member 26" occupies the pushing position, the distributor 80" occupies its connecting position.

The operation of the brake cylinder 1" is described next.

When an operator operates the multiplier lever 31", the distributor 80" goes to the connecting position. Now in fluid communication with the atmosphere and isolated from the pneumatic pressure agent source, the chamber 10" is vented very quickly. Isolating the chamber 10" from the pressure agent source limits venting to the volume of compressed air contained in the chamber 10" (at the time the distributor 80" changes position) and thus prevents loss of compressed air in the supply circuit.

In parallel with the change of position of the distributor 80", the auxiliary actuating member 26" pushes against the piston 13", thus applying to the piston 13" a manual braking force that is substituted for the braking force exerted before by the compressed air contained in the chamber 10".

Figure 7:
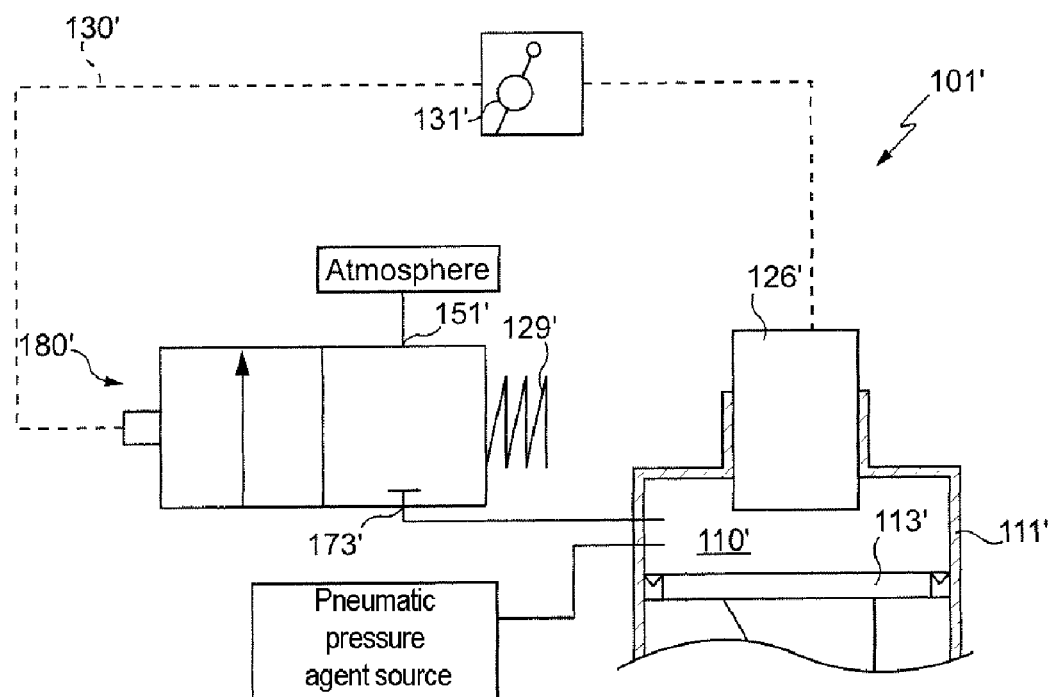
FIG. 7 illustrates diagrammatically the operation of a brake cylinder of a second embodiment of the invention.

FIG. 7 shows diagrammatically a second embodiment of a brake cylinder of the invention for which the same reference numbers have been used as for the first embodiment but increased by 100.

The body 111', the piston 113' and the elements of the cylinder 101' that are not represented are identical to those of the first embodiment.

The selective connection means between orifices consist here of a distributor 180' of the monostable type with two positions (thanks to the presence of a spring 129') but having only two external orifices 151' and 173' respectively connected to atmosphere and to the pressure chamber 110'.

The distributor 180' is adapted to occupy:

a stable isolating first position in which the orifices 151' and 173' are isolated from each other; and a connecting second position in which the orifices 151' and 173' are in fluid communication.

In this embodiment the pressure chamber 110' is permanently connected to the pneumatic pressure agent source. It is therefore vented completely when the distributor 180' goes to its connecting position because of the force exerted by the multiplier lever 131'.

In the same manner as before, the distributor 180' and the auxiliary actuating member 126' are connected by mechanical connecting means 130' with the result that they can be actuated simultaneously, for example with the aid of a multiplier lever 131', so that:

when the auxiliary actuating member 126' occupies the rest position, the distributor 180' occupies its stable isolating position; and when the auxiliary actuating member 126' occupies the pushing position, the distributor 180' occupies its connecting position.

The operation of the brake cylinder 101' is described next.

When an operator actuates the multiplier lever 131', the distributor 180' moves to the connecting position. Now in fluid communication with the atmosphere, the chamber 110' and the compressed air supply circuit are vented very quickly. In parallel with the change of position of the distributor 180', the auxiliary actuating member 126' pushes against the piston 113', thus applying to this piston 113' a manual braking force that is substituted for the braking force exerted before by the compressed air contained in the chamber 110'.

Figure 4:
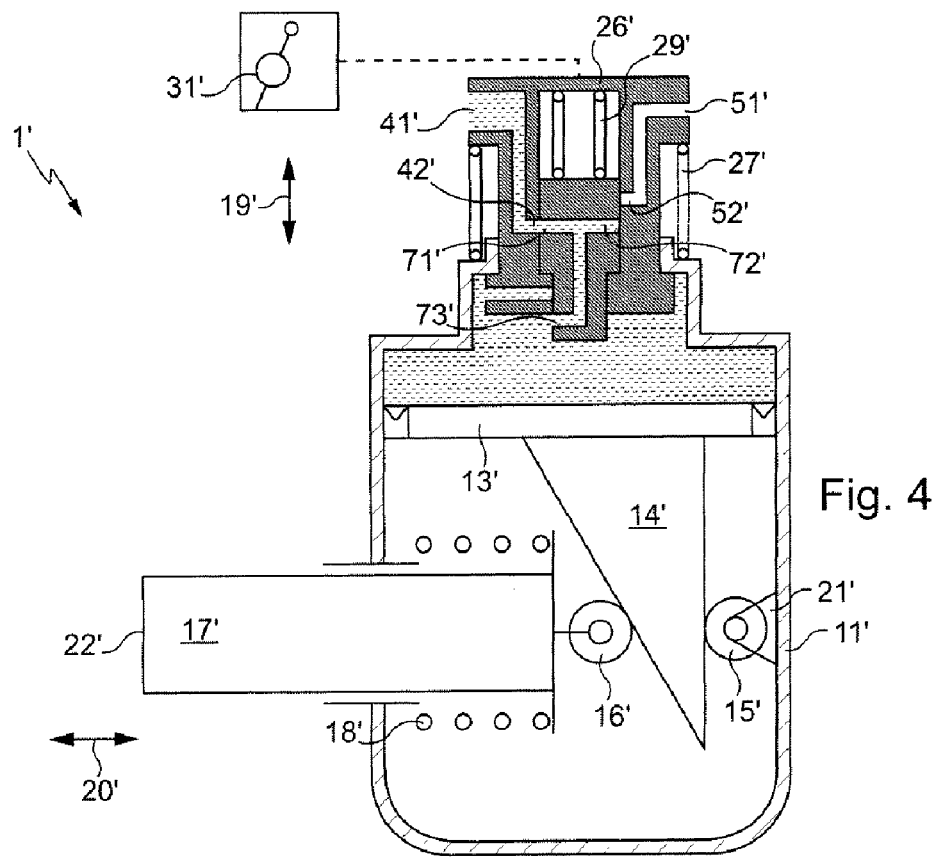
Figure 5:
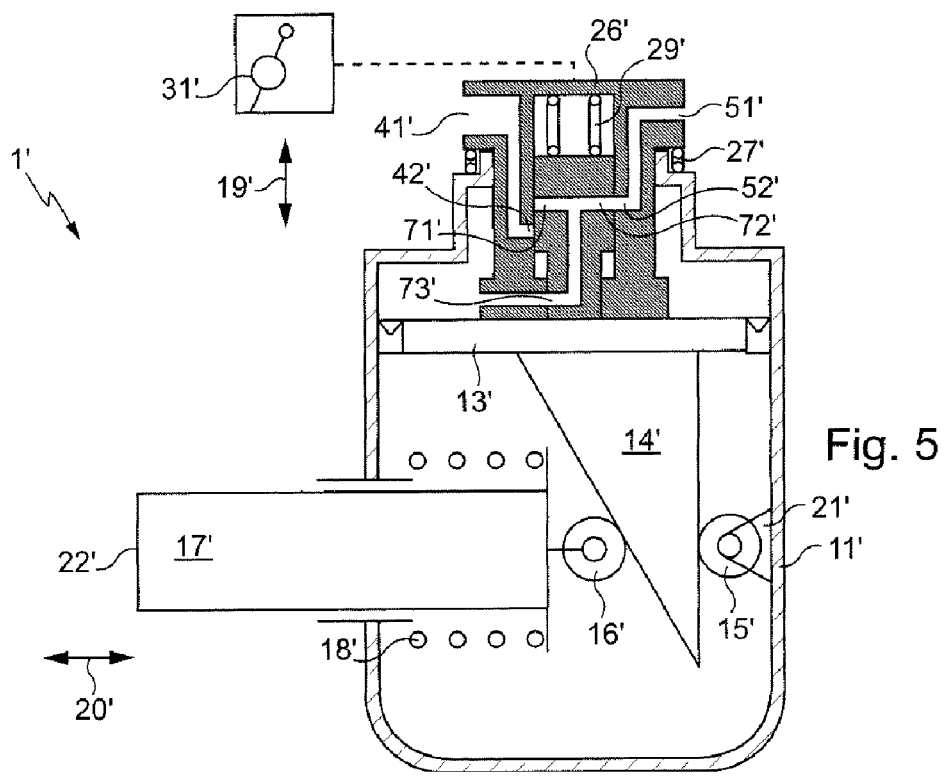

In a variant of this second embodiment that is not shown, the selective connecting means can include instead of the distributor 180' a slide mobile in the auxiliary actuating member 126' in a similar manner to the first embodiment illustrated by FIGS. 3 to 5.

Figure 8:
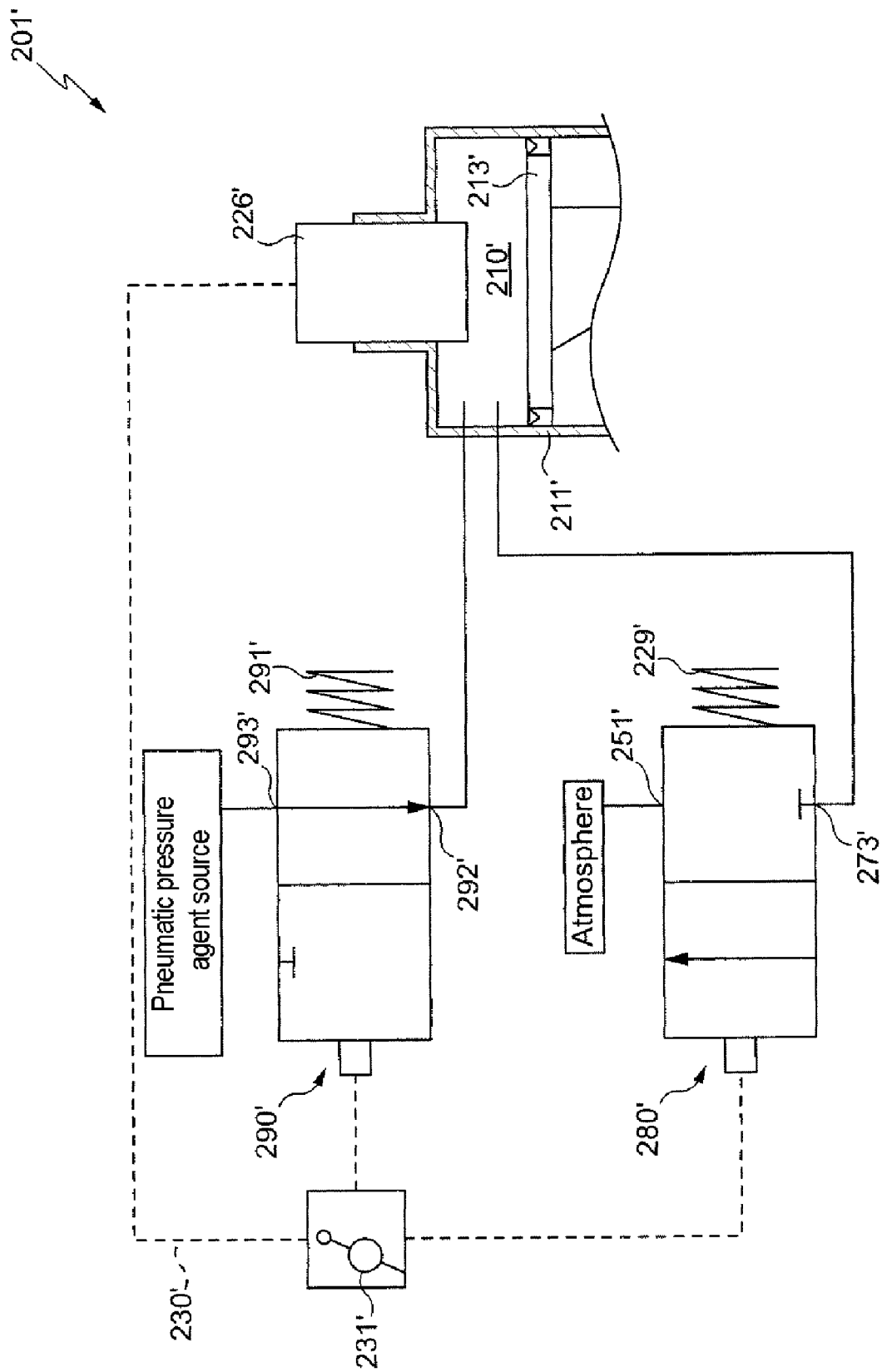
FIG. 8 illustrates diagrammatically the operation of a brake cylinder of a third embodiment of the invention.

FIG. 8 shows diagrammatically a third embodiment of a brake cylinder of the invention for which the same reference numbers have been used as for the first embodiment but increased by 200.

The body 211', the piston 213' and the elements of the cylinder 201' that are not represented are identical to those of the previous embodiments.

The cylinder 201' includes two distributors 280' and 290' of the monostable type with two positions thanks to the presence of respective springs 229', 291'.

The distributor 280' has two external orifices 251' and 273' in fluid communication with the atmosphere and with the pressure chamber 210', respectively.

This distributor 280' is adapted to occupy a stable isolating first position in which the orifices 251' and 273' are isolated from each other and a connecting second position in which the orifices 251' and 273' are in fluid communication.

The distributor 290' has two external orifices 292' and 293' connected to the pressure chamber 210' and to a pneumatic pressure agent source, respectively.

This distributor 290' is adapted to occupy a stable connecting first position in which the orifices 292' and 293' are in fluid communication and an isolating second position in which the orifices 292' and 293' are isolated from each other.

The auxiliary actuating member 226' and the distributors 280' and 290' are connected by mechanical connecting means 230' with the result that they can be actuated simultaneously, for example with the aid of a multiplier lever 231', so that:

when the auxiliary actuating member 226' occupies the rest position, the distributor 280' occupies the stable isolating position and the distributor 290' occupies the connecting position; and when the auxiliary actuating member 226' occupies the pushing position, the distributor 280' occupies the connecting position and the distributor 290' occupies the stable isolating position.

The operation of the brake cylinder 201' is described next.

When an operator actuates the multiplier lever 231', the distributor 280' is moved to its connecting position and the distributor 290' is moved to its isolating position. Now in fluid communication with the atmosphere and isolated from the pneumatic pressure agent source, the chamber 210' is vented very quickly. As explained above, isolating the chamber 210' from the pressure agent source limits venting to the volume of compressed air contained in the chamber 210' (at the moment the distributor 280' changes position) and thus prevents loss of compressed air in the supply circuit.

In parallel with the change of position of the distributors 280' and 290', the auxiliary actuating member 226' pushes against the piston 213', thus applying to this piston 213' a manual braking force that is substituted for the braking force exerted before by the compressed air contained in the chamber 210'.

Note that this embodiment provides exactly the same functions as the first embodiment, that of venting the pressure chamber 210' being effected by the distributor 280' and that of isolating the same pressure chamber 210' from the pneumatic pressure agent source being effected by the distributor 290'.

In other variants that are not shown the lever is replaced by a winch or a crank handle.

Numerous other variants are possible as a function of circumstance, and in this regard it is pointed out that the invention is not limited to the examples described and represented.

The invention claimed is:

1. Railway brake cylinder including:
  a body (11'; 11"; 111'; 211');
  a piston (13'; 13"; 113'; 213') mobile relative to the body (11'; 11"; 111'; 211') to act on a brake linkage and delimiting with said body (11'; 11"; 111'; 211') a pressure chamber (10'; 10"; 110'; 210') adapted to be supplied by a pneumatic pressure agent source;
  an auxiliary actuating member (26'; 26"; 126'; 226') mobile relative to said body (11'; 11"; 111'; 211') and said piston (13'; 13"; 113'; 213'), said actuating member being mechanically connected to manual operating means to cause it to occupy:
    either a rest position in which it is away from said piston (13'; 13"; 113'; 213') and so exerts no force on said piston (13'; 13"; 113'; 213');
    or a pushing position in which it is in contact with said piston (13'; 13"; 113'; 213') and exerts a mechanical force on it;
  characterized in that the brake cylinder includes:
  a first orifice (73'; 73"; 173'; 273') in fluid communication with said chamber (10'; 10"; 110'; 210');
  a second orifice (51'; 51"; 151'; 251') in fluid communication with the atmosphere; and
  selective connection means (28'; 80"; 180'; 280') between said first orifice (73'; 73"; 173'; 273') and said second orifice (51'; 51"; 151'; 251'), said selective connection means (28'; 80"; 180'; 280') being adapted to occupy:
    an isolating position in which said first orifice (73'; 73"; 173'; 273') and said second orifice (51'; 51"; 151'; 251') are isolated from each other; and
    a connecting position in which said first orifice (73'; 73"; 173'; 273') and said second orifice (51'; 51"; 151'; 251') are in fluid communication;
  said selective connecting means (28'; 80"; 180'; 280') being mechanically connected to said auxiliary actuating member (26'; 26"; 126'; 226') so that:
    when said auxiliary actuating member (26'; 26"; 126'; 226') occupies said rest position, said selective connection means (28', 29'; 80"; 180'; 280') occupy said isolating position; and
    when said auxiliary actuating member (26'; 26"; 126'; 226') occupies said pushing position, said selective connecting means (28'; 80"; 180'; 280') occupy said connecting position.

2. Railway brake cylinder according to claim 1, characterized in that said selective connecting means include a slide (28') mounted inside said auxiliary actuating member (26') so that:
  when said auxiliary actuating member (26') is in the rest position, said slide (28') projects from said member toward said piston (13'); and
  when said auxiliary actuating member (26') is in the pushing position, said slide (28') is flush with said auxiliary actuating member (26') and in contact with said piston (13').

3. Railway brake cylinder according to claim 2, characterized in that it includes a third orifice (41') in communication with said pneumatic pressure agent source so that:
  when said slide (28') occupies said isolating position, said third orifice (41') and said first orifice (73') are in fluid communication; and
  when said slide (28') occupies said connecting position, said third orifice (51') and said first orifice (73') are isolated from each other.

4. Railway brake cylinder according to claim 2, characterized in that it includes a spring (29') for continuously loading said slide (28') toward said projecting position.

5. Railway brake cylinder according to claim 4, characterized in that said spring (29') is disposed between said slide (28') and said auxiliary actuating member (26').

6. Railway brake cylinder according to claim 1, characterized in that said manual operating means include a force multiplier member (31') for acting on said auxiliary actuating member (26').

7. Railway brake cylinder according to claim 1, characterized in that said selective connecting means include a distributor (80"; 180'; 280') including said first orifice (73"; 173'; 273') and said second orifice (51"; 151'; 251'), said distributor (80"; 180'; 280') and said auxiliary actuating member (26"; 126'; 226') being connected by mechanical connecting means (30"; 130'; 230') so that they can be actuated simultaneously.

8. Railway brake cylinder according to claim 7, characterized in that said distributor (80"; 180'; 280') includes return means (29"; 129'; 229') for loading it continuously toward its isolating position.

9. Railway brake cylinder according to claim 7, characterized in that said distributor (80") includes a third orifice (41") in fluid communication with said pneumatic pressure agent source so that:
  when said distributor (80") occupies said isolating position, said third orifice (41") and said first orifice (73") are in fluid communication; and
  when said distributor (80") occupies said connecting position, said third orifice (51") and said first orifice (73") are isolated from each other.

10. Railway brake cylinder according to claim 7, characterized in that said pressure chamber (110') is continuously in fluid communication with said pneumatic pressure agent source.

11. Railway brake cylinder according to claim 7, characterized in that said manual operating means include a force multiplier member (31"; 131') for acting on said auxiliary actuating member (26"; 126') and said distributor (80"; 180').

12. Railway brake cylinder according to claim 7, characterized in that it includes a second distributor (290') including a first orifice (292') in fluid communication with said chamber (210') and a second orifice (295') in fluid communication with said pneumatic pressure agent source, said second distributor (290') being adapted to occupy:
  an isolating position in which said first orifice (292') and said second orifice (295') are isolated from each other; and
  a connecting position in which said first orifice (292') and said second orifice (295') are in fluid communication;
  said mechanical connecting means (230') also connecting said second distributor (290') to said auxiliary actuating member (226') and to said distributor (280') so that:
    when said auxiliary actuating member (226') occupies said rest position and said distributor (280') occupies said isolating position, said second distributor (290') occupies said connecting position; and
    when said auxiliary actuating member (226') occupies said pushing position and said distributor (280') occupies said connecting position, said second distributor (290') occupies said isolating position.

13. Railway brake cylinder according to claim 12, characterized in that said second distributor (290') includes return means (291') for continuously loading said second distributor (290') toward its isolating position.

14. Railway brake cylinder according to claim 12, characterized in that said manual operating means include a force multiplier member (231') for acting on said auxiliary actuating member (226'), said distributor (280') and said second distributor (290').

15. Railway brake cylinder according to claim 3, characterized in that it includes a spring (29') for continuously loading said slide (28') toward said projecting position.

16. Railway brake cylinder according to claim 8, characterized in that said distributor (80") includes a third orifice (41") in fluid communication with said pneumatic pressure agent source so that:
- when said distributor (80") occupies said isolating position, said third orifice (41") and said first orifice (73") are in fluid communication; and
- when said distributor (80") occupies said connecting position, said third orifice (51") and said first orifice (73") are isolated from each other.

17. Railway brake cylinder according to claim 8, characterized in that said pressure chamber (110') is continuously in fluid communication with said pneumatic pressure agent source.

18. Railway brake cylinder according to claim 8, characterized in that it includes a second distributor (290') including a first orifice (292') in fluid communication with said chamber (210') and a second orifice (295') in fluid communication with said pneumatic pressure agent source, said second distributor (290') being adapted to occupy:
- an isolating position in which said first orifice (292') and said second orifice (295') are isolated from each other; and
- a connecting position in which said first orifice (292') and said second orifice (295') are in fluid communication;
- said mechanical connecting means (230') also connecting said second distributor (290') to said auxiliary actuating member (226') and to said distributor (280') so that:
- when said auxiliary actuating member (226') occupies said rest position and said distributor (280') occupies said isolating position, said second distributor (290') occupies said connecting position; and
- when said auxiliary actuating member (226') occupies said pushing position and said distributor (280') occupies said connecting position, said second distributor (290') occupies said isolating position.

19. Railway brake cylinder according to claim 13, characterized in that said manual operating means include a force multiplier member (231') for acting on said auxiliary actuating member (226'), said distributor (280') and said second distributor (290').

* * * * *